United States Patent
Itoyama et al.

(10) Patent No.: US 6,990,802 B2
(45) Date of Patent: Jan. 31, 2006

(54) APPARATUS AND METHOD FOR REGENERATING PARTICULATE FILTER THAT REMOVES PARTICULATES OUT OF EXHAUST GAS FOR INTERNAL COMBUSTION ENGINE

(75) Inventors: Hiroyuki Itoyama, Yokohama (JP); Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/407,332

(22) Filed: Apr. 7, 2003

(65) Prior Publication Data

US 2003/0188518 A1 Oct. 9, 2003

(30) Foreign Application Priority Data

Apr. 8, 2002 (JP) .............................. 2002-104705

(51) Int. Cl.
*F01N 3/00* (2006.01)
(52) U.S. Cl. .............................. 60/295; 60/274; 60/286; 60/297; 60/311
(58) Field of Classification Search ................. 60/274, 60/278, 280, 285, 286, 295, 297, 311
See application file for complete search history.

(56) References Cited

U.S. PATENT DOCUMENTS

| 4,719,751 | A | * | 1/1988 | Kume et al. ................... 60/285 |
| 5,319,930 | A | | 6/1994 | Shinzawa et al. |
| 5,746,989 | A | * | 5/1998 | Murachi et al. ......... 423/213.7 |
| 6,438,948 | B2 | * | 8/2002 | Ono et al. ..................... 60/311 |
| 6,490,857 | B2 | * | 12/2002 | Sasaki .......................... 60/278 |
| 6,588,204 | B2 | * | 7/2003 | Hirota et al. ................. 60/297 |

FOREIGN PATENT DOCUMENTS

| EP | 1 087 114 A1 | 3/2001 |
| EP | 1 108 866 A2 | 6/2001 |
| JP | 5-312022 A | 11/1993 |

* cited by examiner

*Primary Examiner*—Binh Q. Tran
(74) *Attorney, Agent, or Firm*—Foley & Lardner LLP

(57) ABSTRACT

A particulate deposit amount Spm on a particulate filter disposed in an exhaust passage is estimated during a usual period different from a regeneration period of the particulate filter and during the regeneration period thereof respectively.

An increase value Dpm per unit time of the Spm during the usual period is estimated based upon an engine operating condition and a total amount of the Spm is determined by integration thereof (S15, 16).

On the other hand, a particulate deposit amount Spm decreasing by burning during the regeneration period is determined by, one by one, subtracting a decrease value Dpm per unit time estimated based upon a particulate deposit amount Spmi that is determined by the above integration at a starting point of the regeneration period from the Spmi (S12, 17).

24 Claims, 10 Drawing Sheets

(a) DEPOSIT AMOUNT DECREASE VALUE
(ADDITION AMOUNT DURING REGENERATION)

(b) DEPOSIT AMOUNT INCREASE VALUE
(ADDITION AMOUNT AT A USUAL PERIOD)

(a) SpmSLH (b) SpmSLL

APPARATUS AND METHOD FOR REGENERATING PARTICULATE FILTER THAT REMOVES PARTICULATES OUT OF EXHAUST GAS FOR INTERNAL COMBUSTION ENGINE

BACKGROUND OF THE INVENTION

1. Field of the Invention

This invention relates to an apparatus for regeneration of a particulate filter disposed in an exhaust passage that removes particulates out of an exhaust gas in a diesel engine and the like.

2. Related Art of the Invention

There is known a particulate filter that removes particulates out of an exhaust gas in a diesel engine. The particulate filter needs to remove deposited particulates for regeneration thereof before the particulates are deposited excessively. Removal of the particulates is carried out in general by burning the particulates.

A Japanese Unexamined Patent Publication No. 05-312022 discloses that a starting point of regeneration period of the particulate filter is made considering an amount of unburned particulates remaining on the particulate filter after the particulate filter has been regenerated previously.

In this Publication, the unburned, remaining amount of the particulates is estimated by a fuzzy theory based upon a filter temperature detection signal from a temperature sensor disposed respectively at a center and a periphery of the particulate filter.

SUMMARY OF THE INVENTION

The reason the unburned, remaining amount of the particulates is taken into account in deciding a starting point of regeneration period of the particulate filter is that an optimal, starting point of the next regeneration period of the particulate filter depends on the remaining particulates unburned. Since burning of the particulates deposited on the particulate filter proceeds in the form of propagation burning, there is a case where some of the particulates deposited do not burn and remain caused by various conditions during burning thereof.

However, in this earlier technology, a plurality of parameters (a center temperature and a peripheral temperature of the particulate filter) are necessary for estimating an amount of the unburned, remaining particulates and cost increase accompanying temperature sensors can not be avoided. Also an application of the fuzzy theory makes logic more complicated.

The present invention simply estimates a particulate deposit amount on a particulate filter throughout an entire engine operating period that includes a regeneration period of the particulate filter and a usual period different from the regeneration period thereof, and regenerates the particulate filter for a proper period.

Therefore, the present invention estimates a particulate amount deposited when the particulate filter starts to be regenerated and this deposit amount at the regeneration start is used as a parameter for estimating the deposit amount of the particulates decreasing during regenerating the particulate filter.

One aspect of the present invention provides an apparatus for regeneration of a particulate filter in an exhaust passage for an internal combustion engine.

The apparatus comprises a particulate filter that removes particulates out of an exhaust gas and a controller that performs a process which regenerates the particulate filter by removing the particulates deposited on the particulate filter.

The controller estimates an amount of the particulates deposited on the particulate filter during a usual period different from the regeneration period and judges whether or not the particulate filter is on a condition for regeneration thereof based upon the estimated amount.

When the controller judges that the particulate filter is on a condition for the regeneration, the particulates deposited on the particulate filter start to be burned for regenerating the particulate filter, as well as the particulate deposit amount at this time is set as a deposit amount at a starting point of the regeneration period, and the deposit amount of the particulates decreasing during regenerating the particulate filter is estimated upon the set deposit amount at the starting point of the regeneration period of the particulate filter.

A different aspect of the present invention provides a method of regenerating a particulate filter disposed in an exhaust passage for an internal combustion engine. The method estimates an amount of particulates deposited on a particulate filter during a usual period different from a regeneration period of the particulate filter and judges whether or not the particulate filter is on a condition for regeneration.

When it is judged that the particulate filter is on a condition for the regeneration, the particulates deposited on the particulate filter start to be burned and the particulate deposit amount at this time is set as a deposit amount at a starting point of the regeneration period and a deposit amount of the particulates decreasing during regenerating the particulate filter is estimated based upon the set deposit amount at the starting point of regeneration period of the particulate filter.

These and other aspects, and features of this invention will be understood from the following description with accompanying drawings.

DETAILED EXPLANATION OF THE PREFERRED EMBODIMENTS

Figure 1:
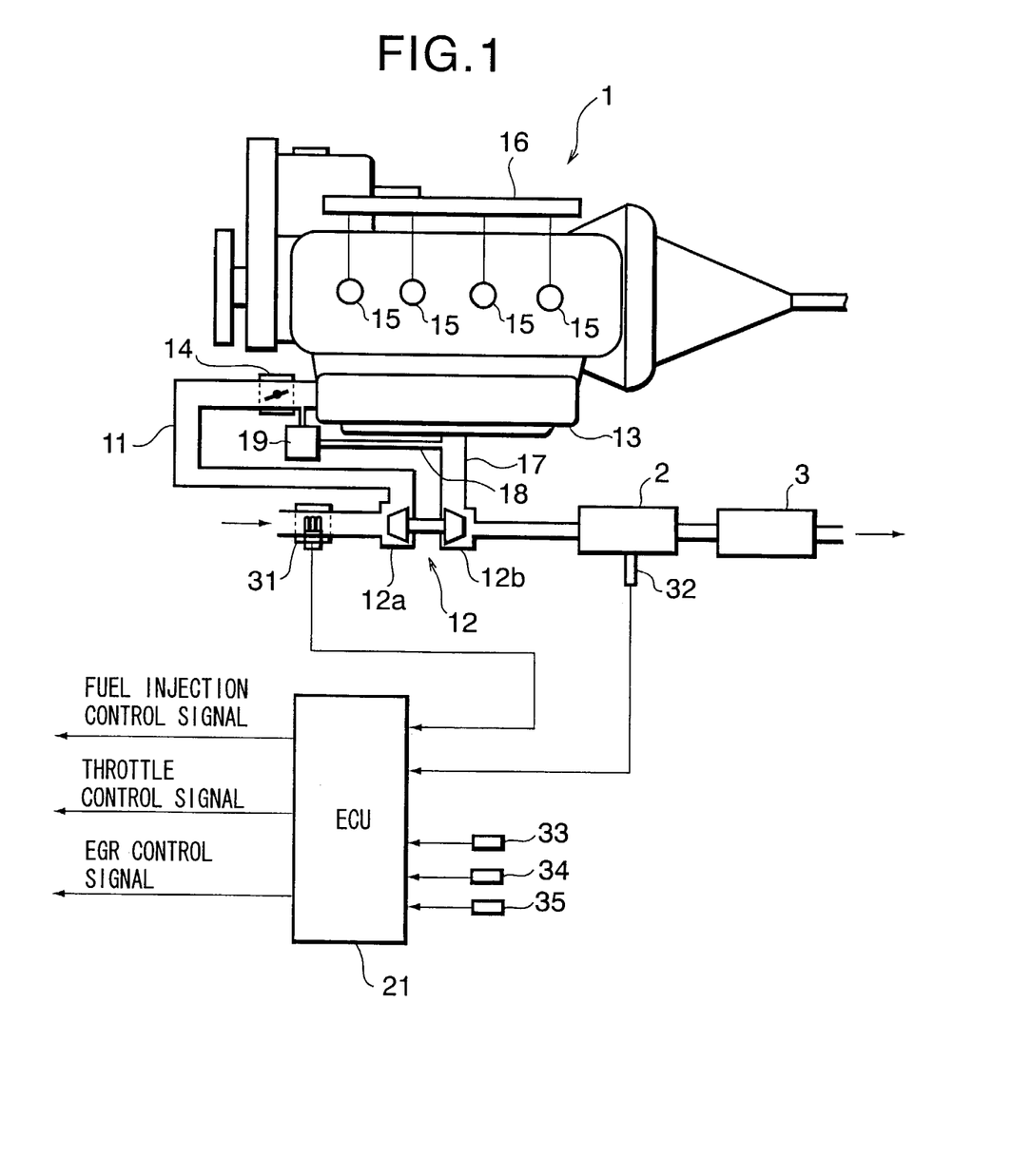
FIG. 1 is a construction view of a diesel engine comprising an apparatus of an embodiment according to the invention.

As shown in FIG. 1, a diesel engine 1 (engine 1 hereinafter) including an apparatus of an embodiment according to the invention is provided with NOx trap catalyst 2 and a diesel particulate filter 3 (DPF hereinafter) as a particulate filter.

NOx trap catalyst 2 positioned upstream of DPF 3 traps nitrogen oxidants (NOx hereinafter) in the exhaust gas when an air-fuel ratio of the exhaust gas is lean and removes them from the exhaust gas.

When the air-fuel ratio of the exhaust gas becomes rich, NOx catalyst 2 releases and reduces the trapped NOx. DPF 3 is formed of honeycomb molding such as a fine porous ceramic. DPF 3 is formed of honey nest-like passages an inlet and an outlet of which are closed alternately and filters the exhaust gas and can trap particulates emitted from engine 1. A passage wall of DPF 3 is coated with a layer having as a catalyst component a catalyst oxide for purifying hydrocarbon, carbon oxide and the like.

An intake passage 11 connected to an engine body has an air cleaner (not shown) in an introduction portion thereof that removes dusts in the intake air. A hot wire type airflow meter 31 is disposed right downstream of the air cleaner.

An intake air amount is detected by airflow meter 31. An intake air detection signal from airflow meter 31 is input to an engine controller 21 (ECU hereinafter). A catalyst temperature detection signal from a temperature sensor 32 disposed at NOx trap catalyst 2, a crank angle position detection signal from a crank angle sensor 33, an acceleration pedal opening angle detection signal from an acceleration sensor 34, and a water temperature detection signal from a water temperature sensor 35 other than the intake air amount detection signal are input to ECU 21.

ECU 21 calculates an engine rotation speed Ne based upon the crank angle position detection signal. A compressor portion 12a of a variable nozzle turbocharger 12 is disposed at intake passage 11 and the intake air passing through airflow meter 31 is pressurized and sent out. The pressurized intake air is distributed in a manifold portion to each cylinder.

In engine 1, a throttle valve 14 is disposed right upstream of a surge tank 13 a pressure of which can be negative by throttle valve 14. Throttle valve 14 opens and closes by an actuator such as a stepping motor that is activated based upon a control signal from ECU 21.

An injector 15 is disposed at the engine body for fuel injection with injector 15 being exposed to an upper side and a substantial center of a combustion chamber in each cylinder. Fuel is pressurized to a certain pressure by a fuel pump and is supplied to each injector 15 via a common rail 16.

Injector 15 drives to be open at a certain timing based upon a control signal from ECU 21 and directly injects a certain amount of fuel into a cylinder. A turbine portion 12b of turbocharger 12 is disposed at an exhaust passage 17.

A turbine wheel of turbine portion 12b and a compressor wheel of compressor portion 12a are fixed together by a shaft. The exhaust gas flowing into turbine portion 12b rotates the turbine wheel, thereby rotating the compressor wheel.

Exhaust passage 17 is connected to a surge tank 13 upstream of turbine portion 12b, as well as downstream of a convergent point with the manifold portion and forms a passage 18 for an exhaust gas recirculation (EGR hereinafter).

A control valve 19 is disposed in EGR passage 18 such that an exhaust gas amount recirculated can be adjusted. The exhaust gas passing through turbine portion 12b is discharged into air through NOx trap catalyst 2 and DPF 3.

At this time the particulates are removed out of the exhaust gas by DPF 3 but when the particulates are deposited excessively in DPF 3, it causes blinding of DPF 3 to deteriorate an engine performance. Therefore, the particulates deposited on DPF 3 are periodically removed, thereby regenerating DPF 3.

Figure 2:
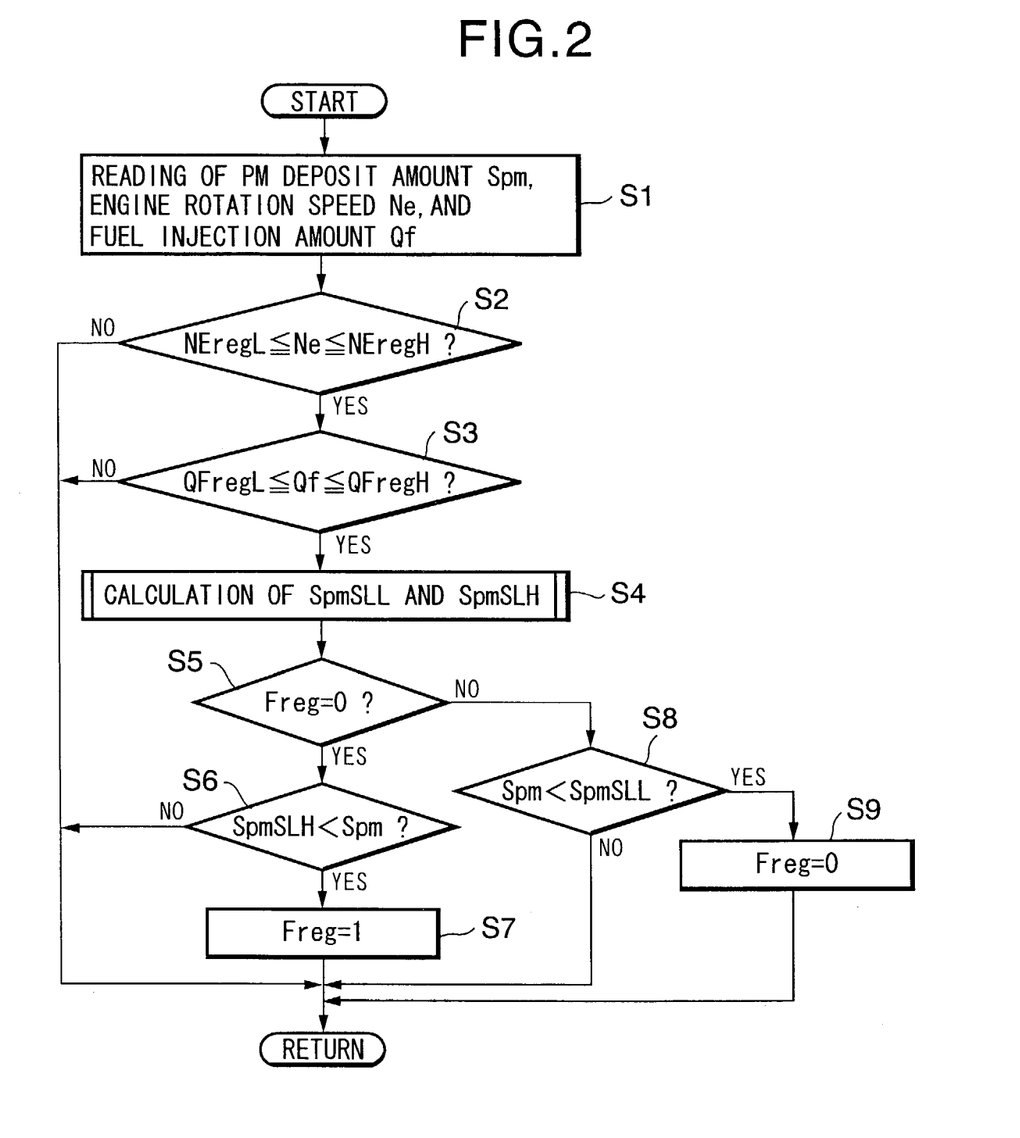
FIG. 2 is a flowchart for regenerating a particulate filter of the embodiment.

Regeneration process of DPF 3 according to an embodiment will be explained with reference to a flowchart. Step 1 (S hereinafter) in FIG. 2 showing a flowchart of DPF regeneration process routine reads a particulate deposit amount Spm at this moment, an engine rotation speed Ne, and a fuel injection amount Qf.

The particulate deposit amount Spm is estimated in a particulate deposit amount estimation routine described later.

Figure 3:
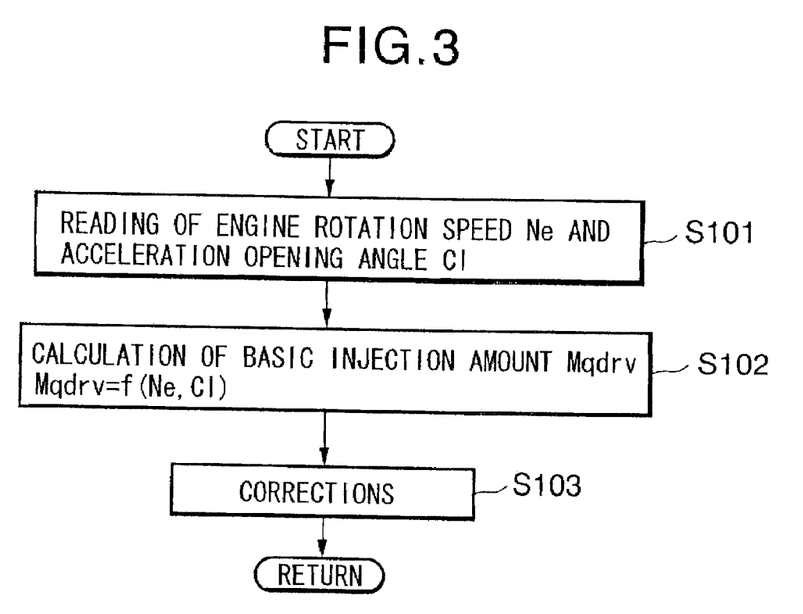
FIG. 3 is a flowchart for setting a fuel injection amount.

In FIG. 3 showing a fuel injection amount setting routine, in S 101 the engine rotation speed Ne and the acceleration opening angle C I are read, and in S 102 a basic injection amount Mqdrv is calculated based upon Ne and C I read.

Figure 4:
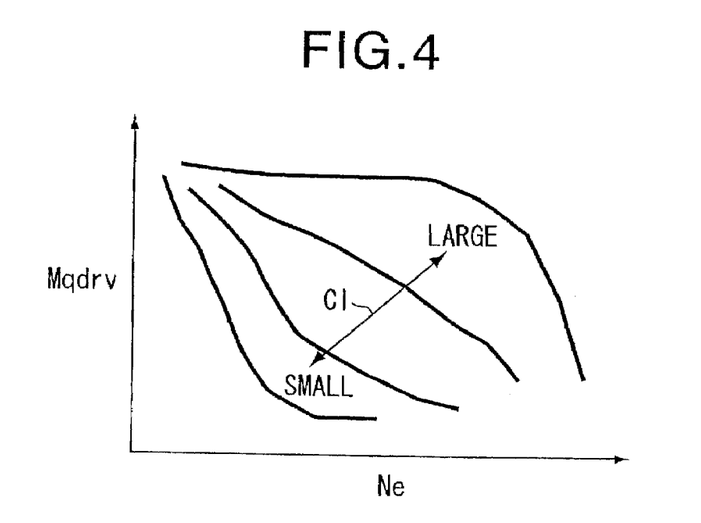
FIG. 4 is a map used for setting a basic fuel injection amount.

Mqrdv is retrieved and determined from a map shown in FIG. 4 and becomes larger as C I is larger. In relation to a certain C I, Mqrdv becomes smaller as Ne is higher. In S 103, Mqrdv is corrected based upon a water temperature and so on, and the corrected result is set as the fuel injection amount Qf.

In S 2 of FIG. 2, it is judged whether or not the engine rotation speed Ne is within a certain range determined by a lower limit value Ne regL and an upper limit value Ne regH. When it is judged that the engine rotation speed Ne is within the range, the process goes to S 3 and when it is not within the range, the routine returns. These S 2 and S 3 are steps wherein it is judged whether or not engine 1 is in an engine operating condition where DPF 3 can be regenerated.

In S 4, a threshold level SpmSLH for judging it is time to regenerate DPF 3 and a threshold level SpmSLL for permitting regeneration process to end are calculated. These threshold levels SpmSLH and SpmSLL will be calculated in a threshold level setting routine described later.

SpmSHL corresponds to a first certain value and Spm SLL corresponds to a second certain value.

In S 5, it is judged whether or not a flag Freg value is 0. The flag Freg is a flag for judging whether or not DPF 3 is in a regeneration period, and a value 1 is replaced in the flag Freg in the regeneration period and a value 0 in the other process. When it is judged that the flag Freg is 0, the process goes to S 6.

When it is judged that the flag Freg is not 0, the process goes to S 8. In S 6, it is judged whether or not the particulate deposit amount exceeds the threshold level SpmSLH. When it is judged that it does, the process goes to S 7. When it does not, the routine returns. In S 7, it is judged that the particulates are deposited exceeding an allowance amount of DPF 3 and it is time to regenerate DPF 3. Then, a value 1 is replaced in the flag Freg, and the routine returns.

On the other hand, when it is judged that the flag Freg is not 0 and DPF 3 is in the regeneration process, the process goes to S 8 wherein it is judged whether or not the particulate deposit amount becomes below the threshold level SpmSLL. When it is judged that it is below the threshold level SpmSLL, the routine returns.

In S 9, it is judged that the process of the particulate deposited on DPF 3 proceeds and DPF 3 has been regenerated. Then, a value 0 is replaced in the flag Freg and the routine returns. Herein judging whether or not the regeneration of the particulate filter ends may be made based upon, not limited to the estimated particulate deposit amount decreasing to a predetermined value, but an elapse time from after judging that it is time to regenerate the particulate filter in S 7. Next, a particulate deposit amount estimation routine will be explained.

Figure 5:
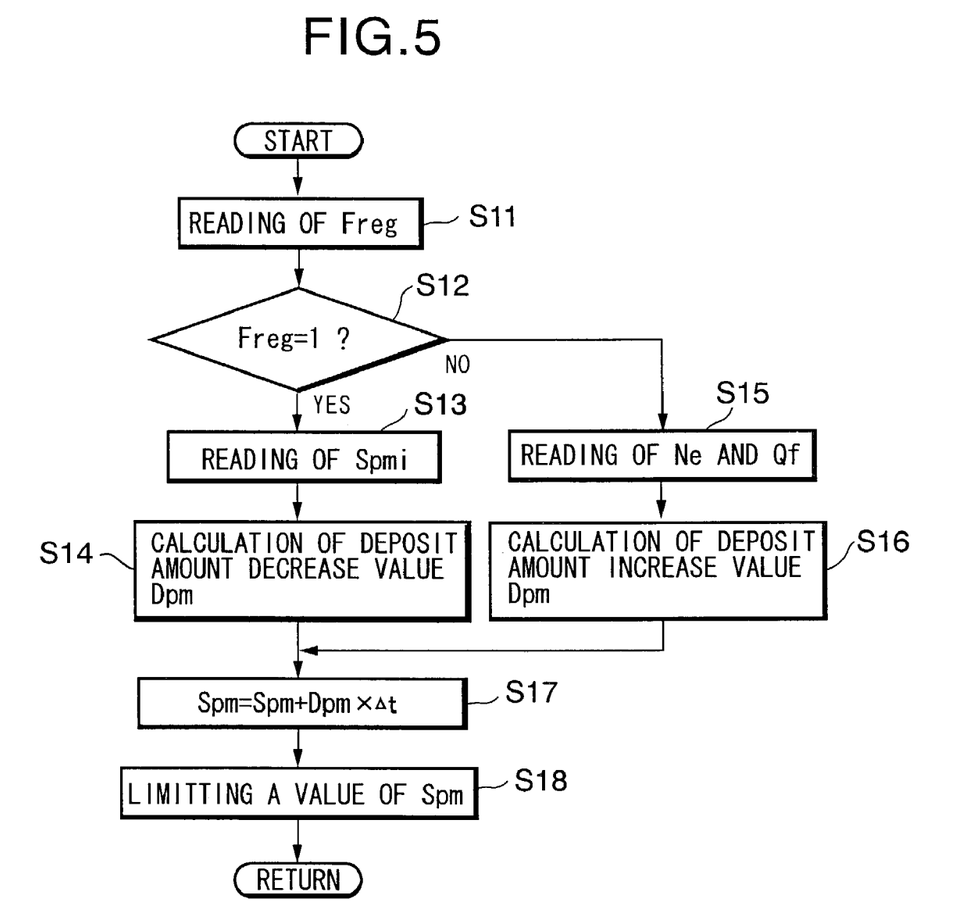
FIG. 5 is a flowchart for estimating a deposit amount of particulates.

In FIG. 5 showing a flowchart of the routine, a flag Freg is read in S 11. In S 12, it is judged whether or not a value of the flag Freg is 0. When it is judged that the flag Freg is 1, the process goes to S 13. When it is judged that the flag Freg is 0, the process goes to S 15.

In S 13, the deposit amount Spmi estimated at a starting point of the regeneration period of DPF 3 is read. Spmi will be set in a deposit amount setting routine at the starting point of the regeneration period. Since the deposited particulates are removed from DPF 3 during the regeneration period, the particulate deposit amount Spm gradually decreases from Spmi.

Figure 6:
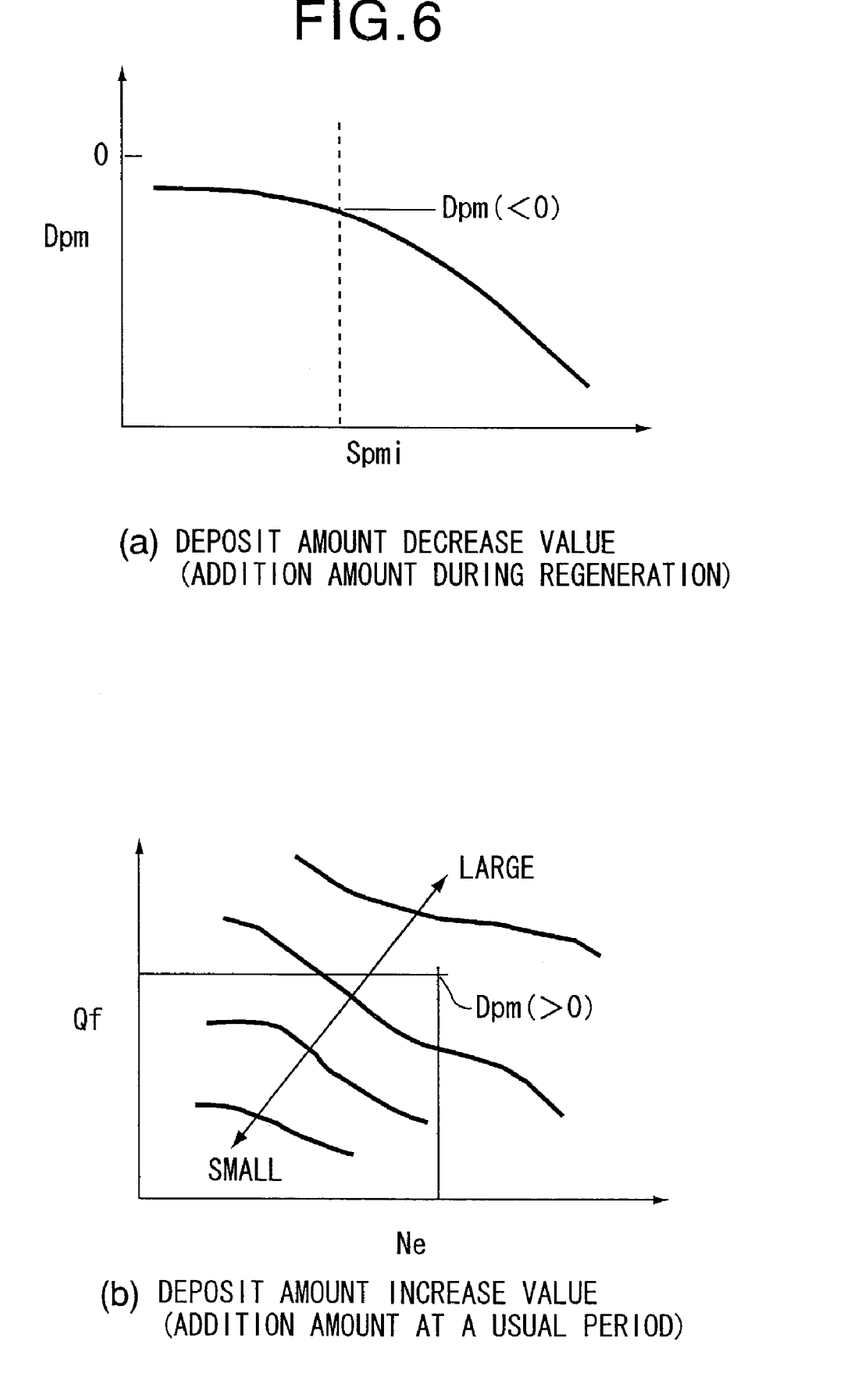
FIG. 6 is a map used for estimating a decrease value and an increase value of the deposit amount.

In S 14, a deposit amount decrease value Dpm is calculated based upon the deposit amount at the starting point of the regeneration period. Dpm calculated during the regeneration period is a decrease amount of the particulate deposit amount per unit time and is set as a larger value as Spmi is larger as shown in FIG. 6(a). Herein, Dpm is a minus value.

On the other hand, when in S 12 it is judged that the flag Freg is 0, the process goes to S 15 wherein an engine rotation speed Ne and a fuel injection amount Qf as an engine operating condition are read. Since the particulates are deposited in DPF 3, the deposit amount Spm thereof gradually increases.

In S 16, a deposit amount increase value Dpm is calculated based upon Ne and Qf read. Dpm calculated at a usual period other than a regeneration period is an increase amount of the particulate deposit amount per unit time and is set as a larger value as Ne is higher and Qf is larger.

In S 17, Spm at the present time is estimated by adding the change amount per unit time Dpm to the particulate deposit amount Spm estimated when this routine has been performed previously (Spm=Spm+Dpm×Δt. Δt:calculation cycle). In S 18, the particulate deposit amount is limited within a predetermined range. When Spm exceeds an upper limit value SPMH, Spm is set as SPMH. When Spm is below a lower limit value SPML, Spm is set as SPML. The estimated Spm is stored each time.

Figure 7:
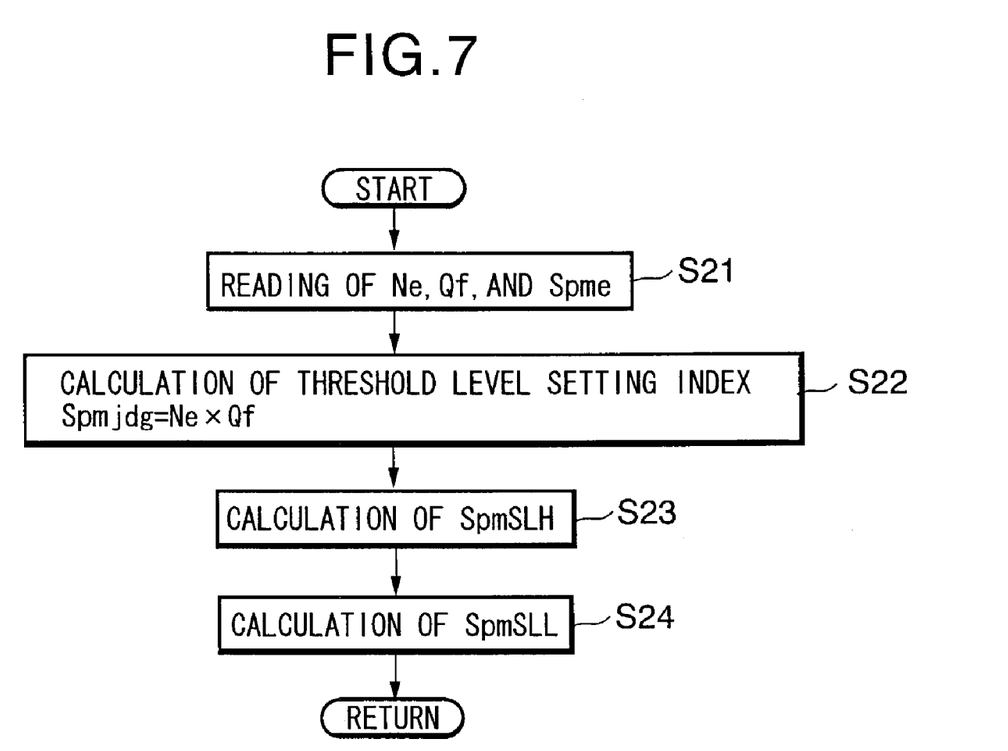
FIG. 7 is a flowchart for setting a threshold level.

A threshold level setting routine will be explained. In FIG. 7 showing a flowchart of the routine, the engine rotation speed Ne and the fuel injection amount Qf as the engine operating condition, and the deposit amount at an ending point of the regeneration period Spme are read. Spme is the particulate deposit amount estimated as remained unburned after the DPF 3 has been regenerated and will be explained at a deposit amount setting routine at the ending point of the regeneration process described later.

Figure 8:
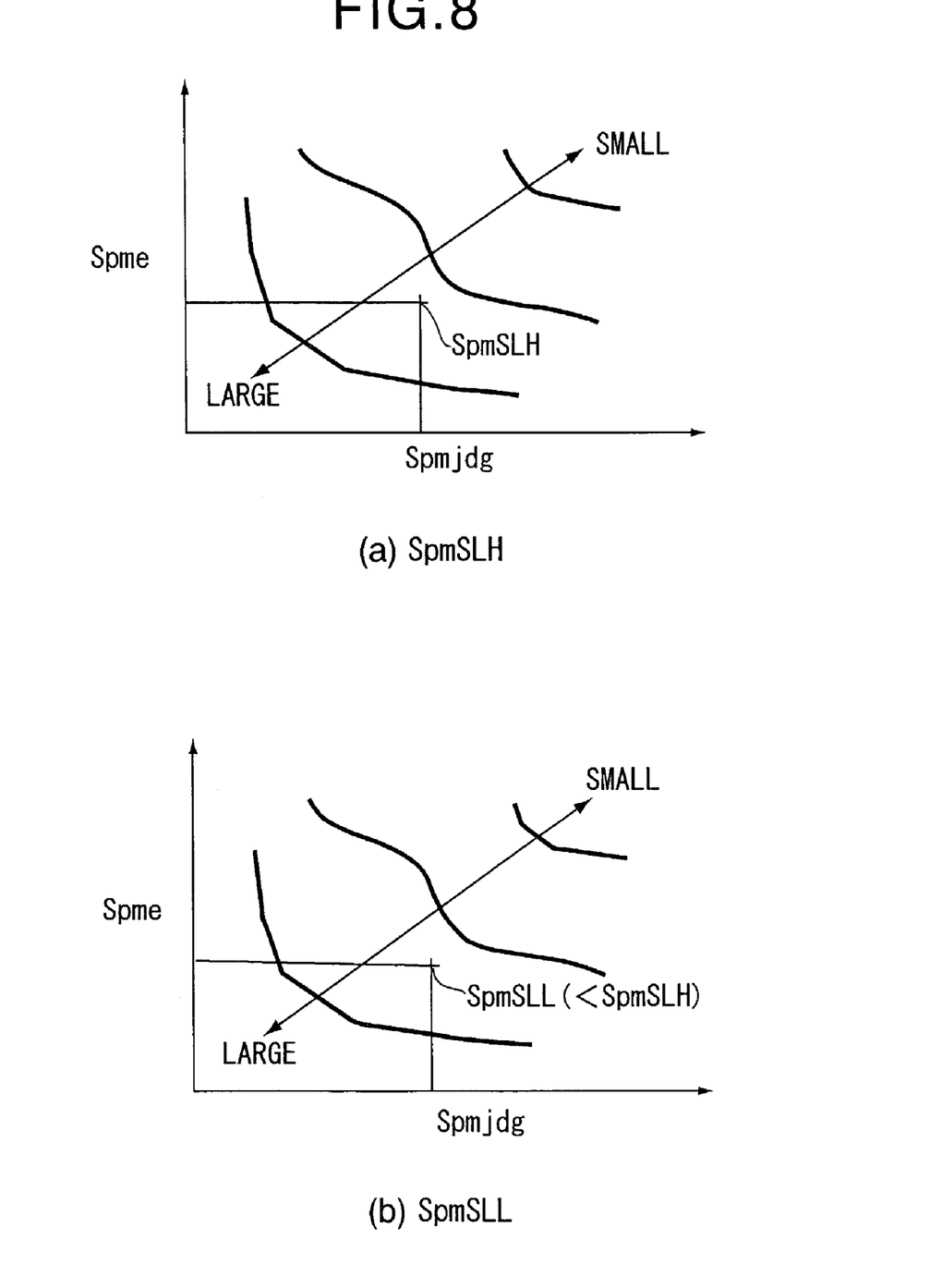
FIG. 8 is a map used for setting the threshold level.

In S 22, a product of Ne and Qf is set as a threshold level setting index Spmjdg which may be retrieved from a map allotted by Ne and Qf. In S 23, a threshold level SpmSLH is calculated. SpmSLH is retrieved from a map allotted by the setting index Spmjdg and the deposit amount at the ending point Spme as shown in FIG. 8(a). SpmSLH is set as a smaller value as Spmjdg is larger, namely Ne is higher and Qf is larger. SpmSLH is set as a smaller value as Spme is larger.

In S 24, a threshold level SpmSLL is calculated. SpmSLL is retrieved from a map allotted by the setting index Spmjdg and the deposit amount at the ending point Spme as shown in FIG. 8(b). SpmSLL is set in relation to Spmjdg and Spme in the same as SpmSLH and when these parameters Spmjdg and Spme are constant, Spm SLL is set as a smaller value than SpmSLH (SpmSLL<SpmSLH).

Figure 9:
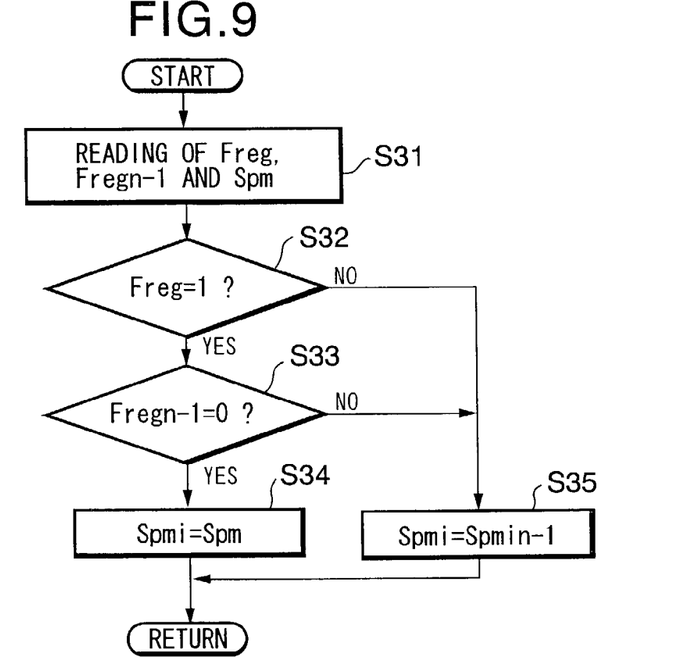
FIG. 9 is a flowchart for setting a deposit amount of the particulates at a start point of regeneration of the particulate filter.

A deposit amount setting routine at the starting point of the regeneration period will be explained.

In FIG. 9 showing a flowchart of the routine, in S 31, the flag Freg, the flag Fregn-1 and the particulate deposit amount Spm are read. The flag Fregn-1 is the flag Freg read when the routine is previously executed. In S 32, it is judged whether or not the flag Freg is 1 and in S 33, the flag Fregn-1 is 0. In these steps, it is judged whether or not the process is in a state immediate after it is judged that it is time to regenerate the particulate filter. When it is so, the process goes to S 34. When it is not, the process goes to S 35.

In S 34, the particulate deposit amount Spm at the present time is set as the deposit amount Spmi at the starting point (Spmi=Spm). In S 35, the deposit amount Spmin-1 at the starting point previously set is set as Spmi (Spmi= Spmin-1). The deposit amount setting routine at the ending point will be explained.

Figure 10:
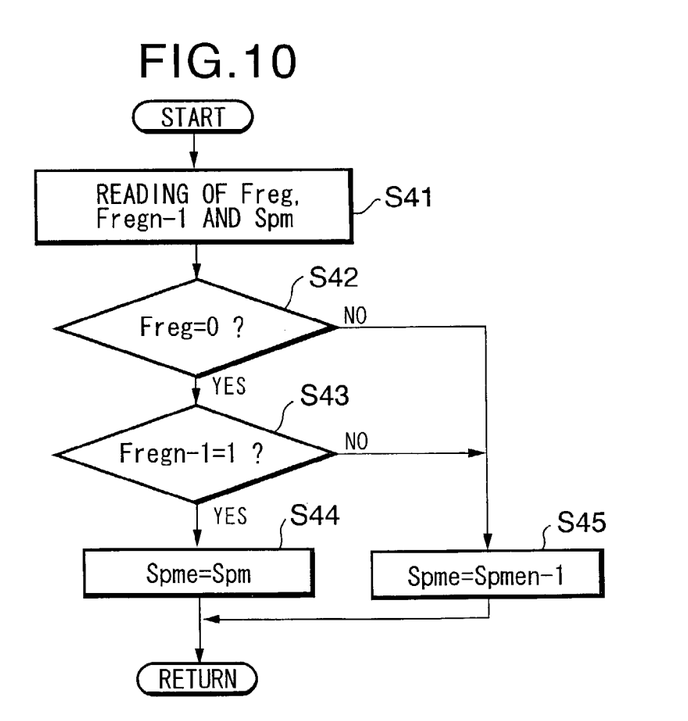
FIG. 10 is a flowchart for setting a deposit amount of the particulates at an ending point of regeneration of the particulate filter.

In FIG. 10 showing a flowchart of the routine, in S 41, the flag Freg, the flag Fregn-1, and the particulate deposit amount Spm are read. In S 42 and S 43, it is judged whether or not the process is in a state immediate after it is judged that DPF 3 has been regenerated. When it is, the process goes to S 44 and when it is not, the process goes to S 45.

In S 44, the particulate deposit amount Spm at the present time is set as the deposit amount Spme at the ending point (Spme=Spm). In S 45, the deposit amount Spmen-1 at the ending point previously set is set as Spme (Spme=Spmen-1).

Figure 11:
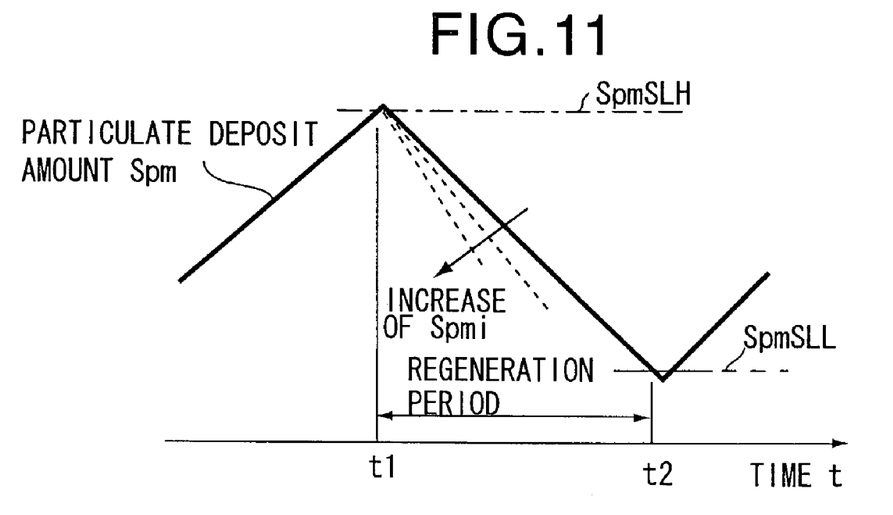
FIG. 11 is a time chart showing variations of the deposit amount of the particulates.

An operation of ECU 21 will be explained based upon a time chart as shown in FIG. 11. ECU 21 sets the threshold level SpmSLH, SpmSLL based upon the engine rotation speed Ne, the fuel injection amount Qf, and the particulate deposit amount Spme estimated at the ending point of the previous regeneration period of DPF 3 (S4).

At the usual period, ECU 21 estimates the particulate deposit amount Spm based upon the engine operating condition of engine 1. Namely, Spm is estimated by integrating the deposit amount increase value Dpm per unit time determined based upon the engine rotation speed Ne and the fuel injection amount Qf (S 16).

When it is judged that it is time to regenerate DPF 3 by detecting that Spm exceeds a threshold level Spm SLH at time ti, the flag Freg changes from 0 to 1 and also Spm at this moment is set as the deposit amount Spmi at the starting point (S 7, S 34). ECU 21 performs a process that burns the deposited particulates for regenerating DPF 3 as follows.

ECU 21 operates engine 1 at a mode of rising an exhaust gas temperature for oxidizing the particulates with oxygen in the exhaust gas to burn. The reason for it, burning the particulates requires a certain high temperature of the DPF 3 (a temperature more than 600 degrees) and an exhaust gas temperature for a diesel engine is usually below that temperature.

At this mode, an air excess rate of the exhaust gas is lowered by further injecting fuel after fuel injection for an engine output so that the exhaust gas temperature is increased. Or the exhaust gas temperature is increased by controlling throttle valve 14 or EGR valve 19.

When a temperature of DPF 3 reaches a certain high temperature, ECU 21 changes the engine mode to an execution mode for regeneration of DPF 3. Namely, more oxygen is supplied by increasing the air excess rate of the exhaust gas to burn and remove the particulates deposited on DPF 3.

ECU 21 estimates the particulate deposit amount Spm decreasing during regeneration period thereof based upon the deposit amount Spmi at the starting point of the regeneration period. Namely, Spm is determined by decreasing the deposit amount decrease value Dpm per unit time estimated based upon Spmi (S14).

When it is judged that DPF 3 has been regenerated based upon by detecting that Spm becomes below the threshold level SpmSLL at time t2, the flag Freg changes from 1 to 0 and Spm at this moment is set as the deposit amount at the ending point thereof (S 9, S 44).

According to an apparatus of the embodiment, the following effect is achieved. First, the particulate deposit amount Spm can be simply estimated based upon the deposit amount at the starting point during the regeneration period of DPF 3. Accordingly a simple logic can be used for estimation without adding a special sensor.

The reason the particulate deposit amount Spm can be estimated based upon the deposit amount Spmi at the starting point is, that the burning of the particulates on DPF 3 proceeds depending on Spmi. The burning of the particulates proceeds in the form of propagation burning and the deposit amount Spmi that has been deposited at the starting point of the burning gradually decreases by the burning in a transitional state thereafter. At the transitional period, the burning velocity of the particulates becomes higher and Spm decreases faster as Spmi is larger (FIG. 6).

Second, the threshold level SpmSLH for judgment of regeneration start of DPF 3 changes corresponding to the engine rotation speed Ne and the fuel injection amount Qf and SpmSLH changes to a smaller value as these Ne and Qf are larger. Thereby, the particulates are efficiently removed.

As described above, the temperature of the exhaust gas needs to rise for regenerating DPF 3. An exhaust gas temperature rises in proportion to an engine output and in an engine operating condition where Ne and Qf are large, the temperature of the exhaust gas is high. Therefore, in such engine operating condition, the regeneration needs less rise amount of the exhaust gas temperature. And when SpmSLH is set as a smaller value, the judgment of the next regeneration start is made sooner. Therefore, regeneration of DPF 3 can be willingly performed with the temperature increase of the exhaust gas remaining small and not so much deterioration of a fuel economy.

Third, the threshold level SpmSLH changes corresponding to the deposit amount Spme at the ending point and to a smaller value as Spme is larger. Accordingly estimation accuracy of the particulate deposit amount during regeneration of DPF 3 can be maintained. Immediately after the regeneration ends, the unburned, remaining particulates are deposited unequally. When a new particulate deposits on the unburned, remaining particulates, a deposit state of the particulate at a next starting point of the regeneration becomes unequal. At the unequal deposit state of the particulates, the particulates do not burn smoothly as set and the estimation accuracy of Spm based upon the deposit amount at the starting point deteriorates.

According to the embodiment, since a next regeneration of DPF 3 begins earlier after the ending point when the unburned, remaining amount is large, more repeat of the regeneration can decrease the unburned, remaining particulates without causing problems such as a filter melting by heat, thereby promoting an equal deposit of the particulates and highly maintaining estimation accuracy of Spm during the regeneration.

Fourth, at the usual period other than the regeneration period of DPF 3, an amount of the particulates emitted from engine 1 changes corresponding to the engine rotation speed Ne and the fuel injection amount Qf. Therefore, the particulate deposit amount at the usual period can be accurately estimated based upon Ne and Qf.

As for the embodiment, the entirety of FIG. 5 shows a deposit amount estimation unit, S 4–S 7 of FIG. 2 shows a regeneration start judgment, and S 8, S 9 of FIG. 2 and the process for a temperature rise of the exhaust gas and regeneration execution thereafter show a regeneration control unit.

Figure 12:
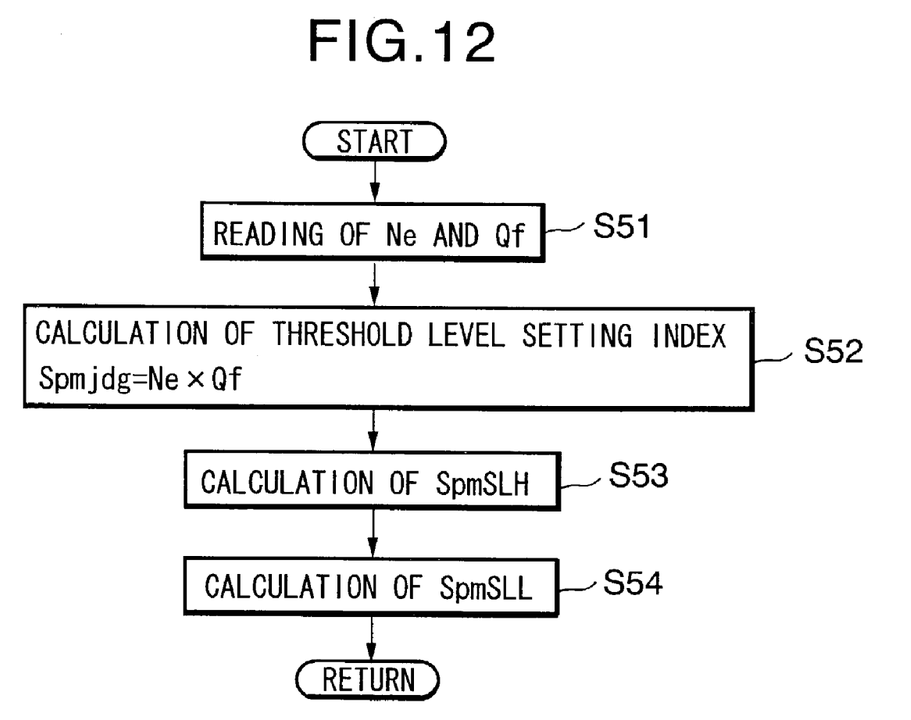
FIG. 12 is a flowchart of a routine for setting a threshold level of a different embodiment according to the invention.

In the above embodiment, the threshold levels SpmSLH, Spm SLL change based upon an engine operating condition of engine 1 and the deposit amount Spm at the ending point. However, these threshold levels may be determined only by the engine operating condition. FIG. 12 shows a flow chart of a threshold level setting routine in such case. ECU 21 reads an engine rotation speed Ne and a fuel injection amount Qf in S 51 and sets a threshold level setting index Spmjdg based upon the read Ne and Qf in S 52. In S 53, a threshold level SpmSLH is set based upon the set Spmjdg and in S 54, a threshold level SpmSLL is set based upon Spm jdg.

Figure 13:
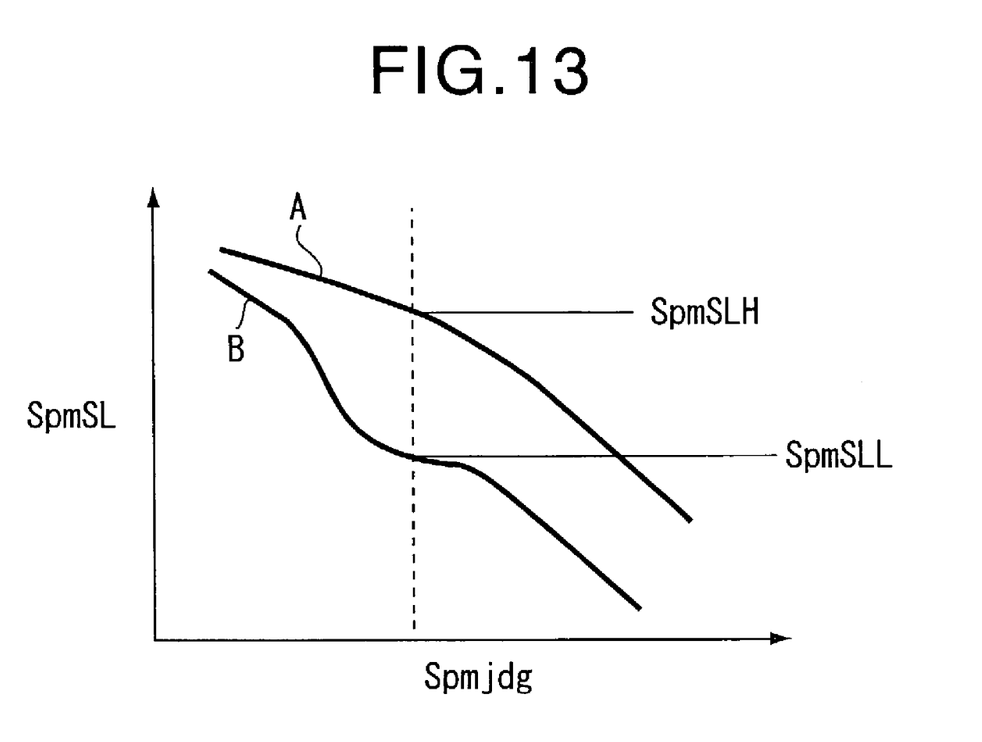
FIG. 13 is a map used for setting the threshold level in the routine.

Each threshold level of SpmSLH, SpmSLL Is set as shown in FIG. 13 and as a smaller value as Spmjdg is larger. Under a constant Spmjdg, SpmSLH is set as larger than SpmSLL.

This application claims priority to Japanese Patent Application No. 2002-104705 filed Apr. 8, 2002. The entire disclosure of Japanese Patent Application No. 2002-104705 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed is:

1. An apparatus for regenerating a particulate filter in an exhaust passage for an internal combustion engine, the particulate filter removing particulates out of an exhaust gas therein, comprising:

a controller that estimates a particulate deposit amount of the particulate filter during an engine operating period, the engine operating period including a regeneration period of the particulate filter, where the particulate filter is regenerated, and a usual period other than the regeneration period, wherein, when the controller judges that the estimated particulate deposit amount is greater than a first predetermined value during the usual period, the controller starts a process that burns particulates deposited on the particulate filter, and sets a particulate deposit amount as a first amount at a starting point of the regeneration period, wherein the controller estimates a particulate deposit amount during the regeneration period based upon the first amount, and wherein the particulate deposit amount during the regeneration period is estimated as a sum of the first amount and a decrease amount, the decrease amount estimated based upon the first amount.

2. An apparatus according to claim 1, wherein, when the controller judges that the estimated particulate deposit amount decreases to a second predetermined value during the regeneration period, the controller ends the regeneration period.

3. An apparatus according to claim 2, wherein the second predetermined value is smaller than the first predetermined value.

4. An apparatus according to claim 3, wherein the controller decreases the first predetermined value as an earlier particulate deposit amount, estimated when the controller earlier judges that the particulate filter has been regenerated, increases.

5. An apparatus according to claim 3, wherein the controller decreases the first predetermined value as an engine rotation speed increases.

6. An apparatus according to claim 3, wherein the controller decreases the first predetermined value as a fuel injection amount increases.

7. An apparatus according to claim 1, wherein the process increases an exhaust gas temperature.

8. An apparatus according to claim 1, wherein the decrease amount is determined by integration of a decrease amount per unit time estimated based upon the first amount.

9. An apparatus according to claim 8, wherein a value of the decrease amount increases as the first amount increases.

10. An apparatus according to claim 1, further comprising:
an engine operating condition detector that detects an engine operating condition, wherein the controller estimates the particulate deposit amount during the usual period based upon the engine operating condition.

11. An apparatus according to claim 10, wherein the particulate deposit amount during the usual period is estimated as a sum of an amount estimated in an earlier estimation and an increase amount from the earlier estimation corresponding to the engine operating condition.

12. An apparatus according to claim 11, further comprising:
an engine rotation speed detector that detects an engine rotation speed, wherein a value of the increase amount increases as the engine rotation speed becomes higher.

13. An apparatus according to claim 11, further comprising:
a fuel injector that injects a certain amount of fuel, wherein a value of the increase amount increases as a fuel injection amount increases.

14. An apparatus for regenerating a particulate filter in an exhaust passage for an internal combustion engine, the particulate filter removing particulates out of an exhaust gas therein, comprising:
first estimation means for estimating a particulate deposit amount in the particulate filter during a usual period, the usual period being other than a regeneration period of the particulate filter;
judging means for judging that the regeneration period should occur when the estimated particulate deposit amount is greater than a first predetermined value;
burning means for burning particulates deposited on the particulate filter during the regeneration period;
setting means for setting a particulate deposit amount at a start of the regeneration period as a first amount;
second estimation means for estimating a particulate deposit amount during the regeneration period of the particulate filter based upon the first amount, and
wherein the particulate deposit amount during the regeneration period is estimated as a sum of the first amount and a decrease amount, the decrease amount estimated based upon the first amount.

15. An apparatus according to claim 14, further comprising:
regeneration ending means for ending the regeneration period when the estimated particulate deposit amount during the regeneration period decreases to a second predetermined value.

16. A method for regenerating a particulate filter that removes particulates out of an exhaust gas for an internal combustion engine, comprising:
estimating a particulate deposit amount on the particulate filter during a usual period, the usual period being other than a regeneration period of the particulate filter;
judging that the regeneration period should occur when the estimated particulate deposit is greater than a first predetermined value during the usual period;
burning particulates deposited on the particulate filter during the regeneration period and setting a particulate deposit amount at a start of the regeneration period as a first amount; and
estimating a particulate deposit amount during the regeneration period based upon the first amount,
wherein the particulate deposit amount during the regeneration period is estimated as a sum of the first amount and a decrease amount, the decrease amount estimated based upon the first amount.

17. A method according to claim 16, further comprising:
ending the regeneration period when the estimated particulate deposit amount during the regeneration period decreases to a second predetermined value.

18. A method according to claim 17, wherein the second predetermined value is smaller than the first predetermined value.

19. A method according to claim 18, wherein the first predetermined value decreases as the particulate deposit amount, estimated when it is judged that the regeneration period should occur, increases.

20. A method according to claim 18, wherein the first predetermined value decreases as an engine rotation speed becomes higher and a fuel injection amount increases.

21. A method according to claim 16, wherein the decrease amount is determined by integration of a decrease amount per unit time estimated based upon the first amount.

22. A method according to claim 21, wherein a value of the decrease amount increases as the first amount increases.

23. A method according to claim 16, wherein the particulate deposit amount during the usual period is estimated based upon an engine operating condition.

24. A method according to claim 23, wherein the particulate deposit amount during the usual period is estimated as a sum of an amount estimated in an earlier estimation and an increase amount from the earlier estimation corresponding to the engine operating condition and the increase amount is set to a value which increases as an engine rotation speed becomes higher and a fuel injection amount increases.

* * * * *